United States Patent
Suzuki

(10) Patent No.: US 9,313,358 B2
(45) Date of Patent: Apr. 12, 2016

(54) IMAGE PROCESSING APPARATUS

(71) Applicant: CANON KABUSHIKI KAISHA, Tokyo (JP)

(72) Inventor: Soichiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/559,352

(22) Filed: Dec. 3, 2014

(65) Prior Publication Data

US 2015/0163370 A1 Jun. 11, 2015

(30) Foreign Application Priority Data

Dec. 5, 2013 (JP) .................................. 2013-252418

(51) Int. Cl.
- *H04N 5/228* (2006.01)
- *H04N 1/21* (2006.01)
- *G06T 1/60* (2006.01)

(52) U.S. Cl.
CPC ................ *H04N 1/2129* (2013.01); *G06T 1/60* (2013.01); *H04N 1/2137* (2013.01); *G06T 2200/28* (2013.01)

(58) Field of Classification Search
CPC ...... H04N 1/2129; H04N 1/2137; G06T 1/60; G06T 2200/28
USPC .......................................... 348/222.1, 231.99
See application file for complete search history.

(56) References Cited

U.S. PATENT DOCUMENTS

| | | | | |
|---|---|---|---|---|
| 8,237,816 | B2 * | 8/2012 | Fishman | H04N 1/2137 348/222.1 |
| 2013/0329071 | A1 * | 12/2013 | Doepke | H04N 5/23258 348/222.1 |
| 2015/0070527 | A1 * | 3/2015 | Yanada | H04N 5/3765 348/222.1 |

FOREIGN PATENT DOCUMENTS

| | | | |
|---|---|---|---|
| JP | 07200778 A | * | 8/1995 |
| JP | 2005-250534 A | | 9/2005 |
| JP | 2006-186917 A | | 7/2006 |

* cited by examiner

*Primary Examiner* — Tuan Ho
*Assistant Examiner* — Zhenzhen Wu
(74) *Attorney, Agent, or Firm* — Cowan, Liebowitz & Latman, P.C.

(57) ABSTRACT

This invention improves the image processing speed by implementing efficient access to a buffer memory while suppressing the access count. For this purpose, when transferring ith partial image data obtained from a first signal processing unit to a buffer memory, a data-transfer controlling unit transfers data out of the ith partial image data except the data of a region overlapping an immediately preceding (i−1)th partial image data to the buffer memory, and transfers the ith partial image data including the data of the overlap region to a subsequent second signal processing unit.

11 Claims, 13 Drawing Sheets

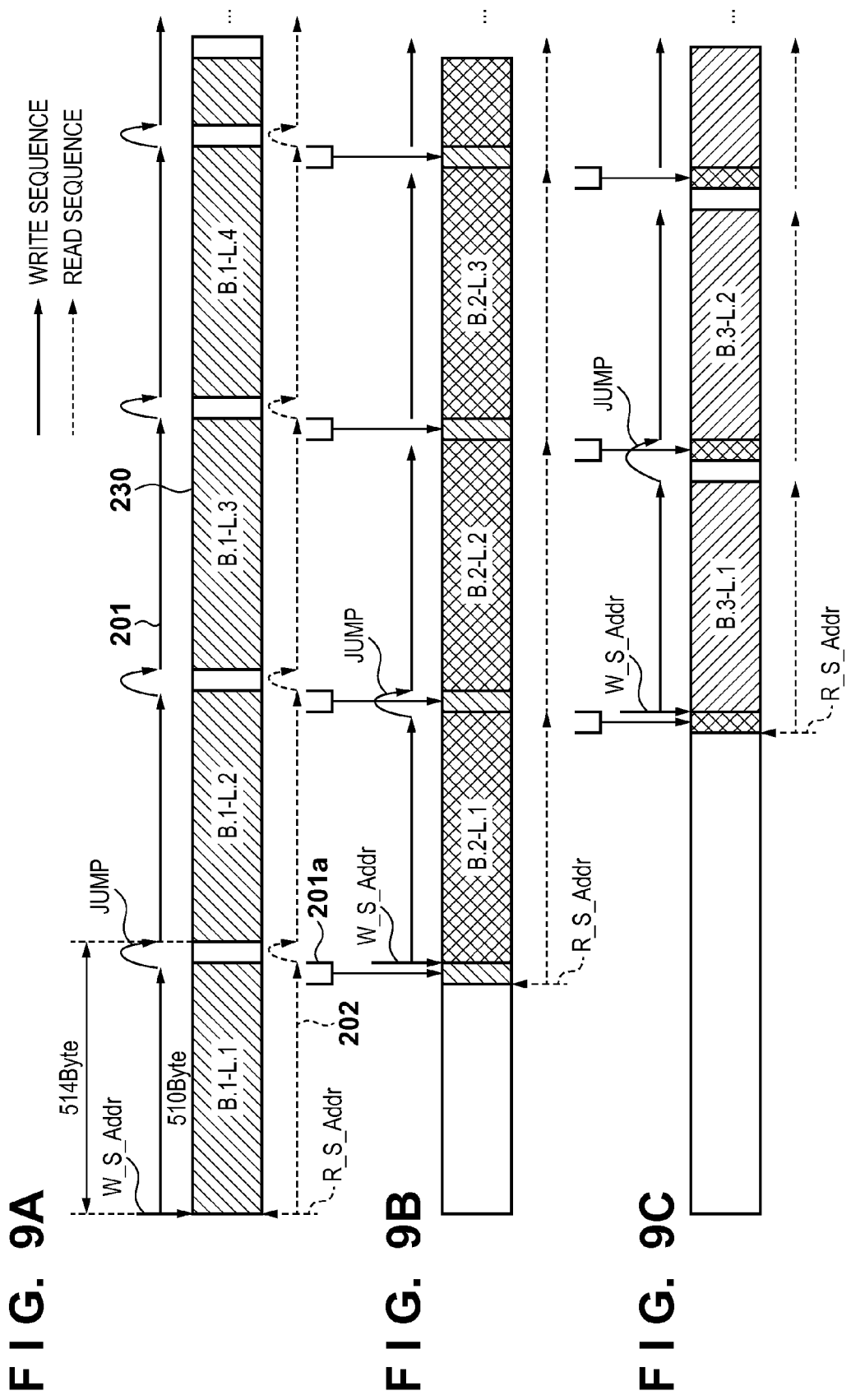

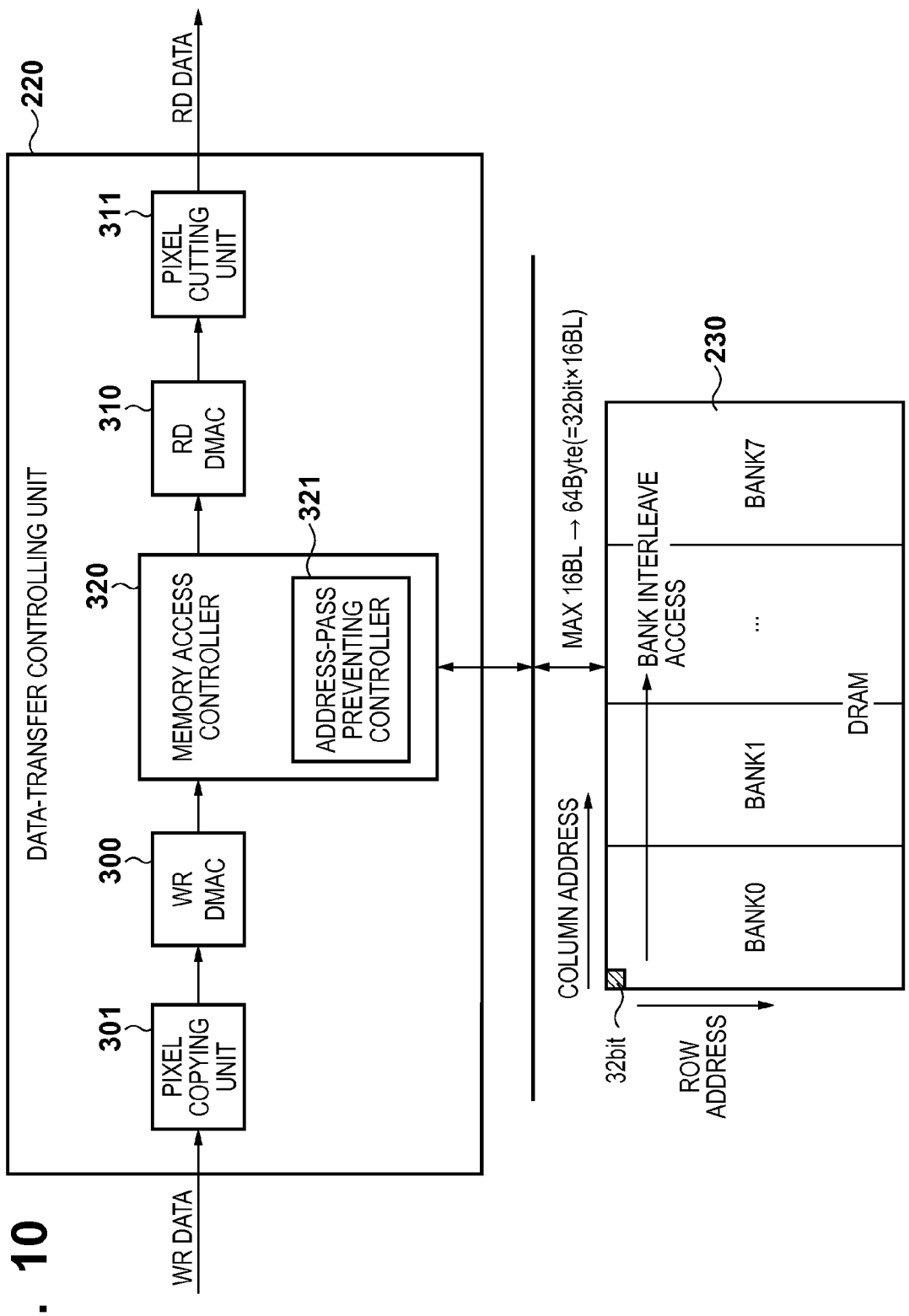

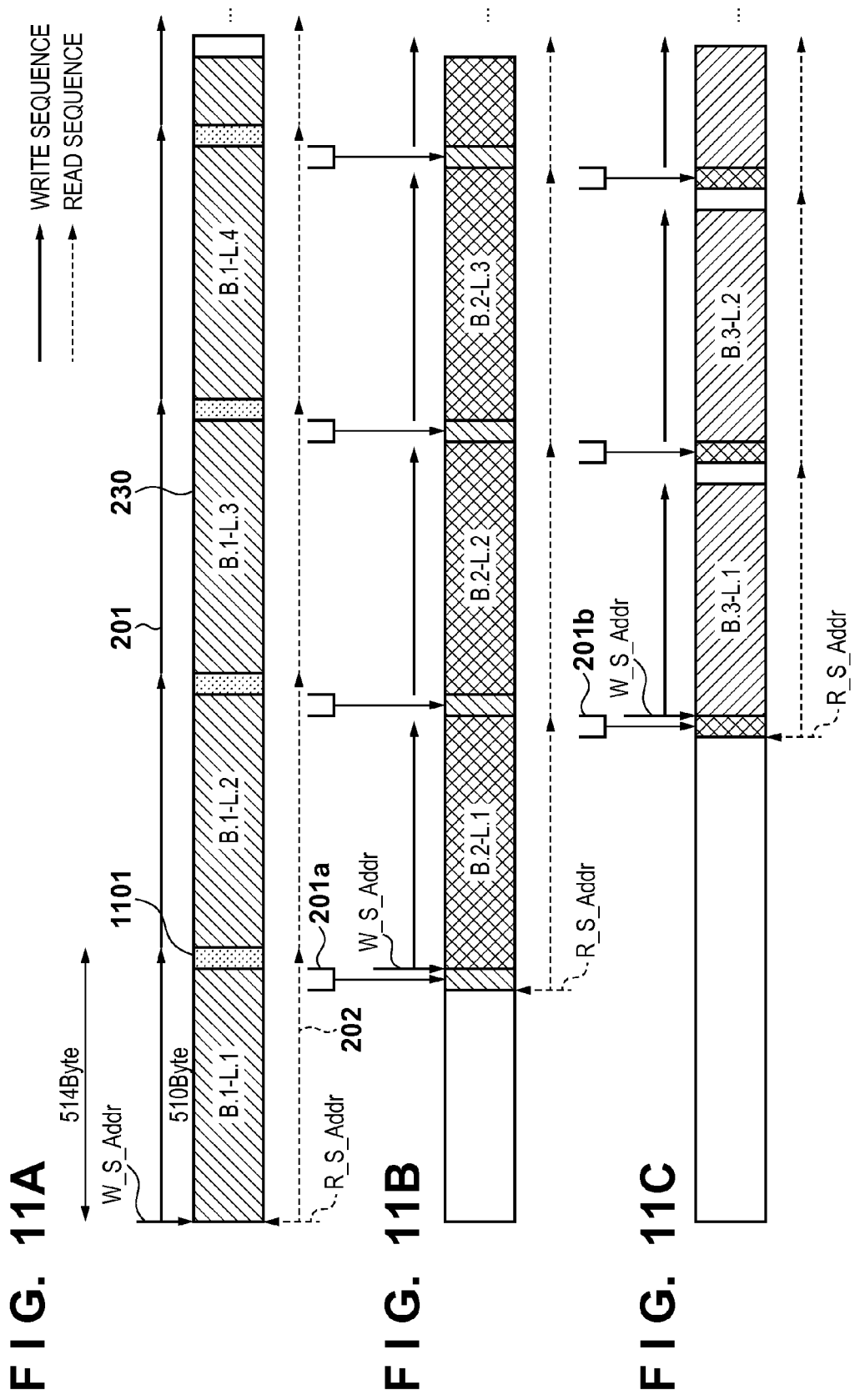

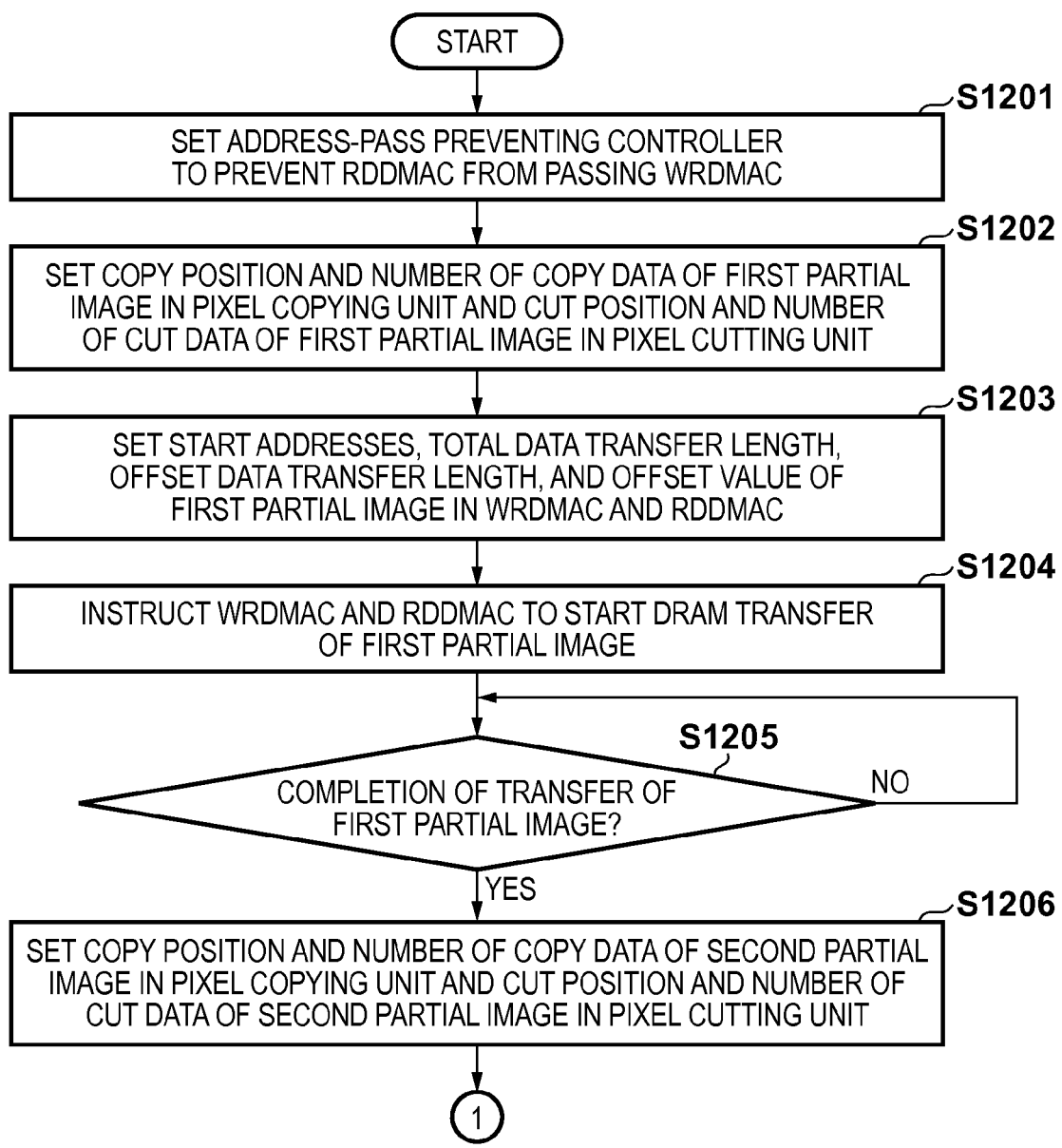
F I G. 12A

IMAGE PROCESSING APPARATUS

BACKGROUND OF THE INVENTION

1. Field of the Invention

The present invention relates to an image processing apparatus.

2. Description of the Related Art

An image processing apparatus such as a digital camera generally performs image processing such as noise reduction, optical distortion correction, and image rotation. For example, there is known a technique of noise reduction processing, which writes, in a DRAM (Dynamic Random Access Memory), a plurality of types of image data generated by dividing image data into a plurality of frequency bands. After that, appropriate filter processing is performed for each image data read out from the DRAM, and the image data processed on a frequency band basis are frequency-composited again, thereby reducing noise.

In such image processing, a line memory such as an SRAM is considered to be used to speed up the filter processing. However, the ever-growing numbers of pixels included in recent images increase the necessary line memory capacity and make the circuit scale large. Additionally, performing such image processing at a higher speed becomes more important along with the recent increase in the number of still image frames in continuous shooting and improvement of moving image frame rates.

Regarding these problems, there are various conventionally known techniques of implementing image processing in a suppressed circuit scale and improvement of the data processing speed.

In Japanese Patent Laid-Open No. 2006-186917 (to be referred to as literature 1 hereinafter), image data is divided into a plurality of regions, and image processing is performed for each divided region, thereby suppressing the circuit scale. That is, processing is performed for each of a plurality of images generated by dividing an image such that the data amount that is needed to be stored in a line buffer falls within the line buffer capacity, thereby suppressing an increase in the line buffer capacity. Note that when performing filter processing in this divisional processing, extra pixel regions (to be referred to as overlap regions hereinafter) necessary for the filter processing are added to the pixels of the upper, lower, left, and right ends of each divided image.

Japanese Patent Laid-Open No. 2005-250534 (to be referred to as literature 2 hereinafter) discloses a technique of quickly performing processing of a divided image that needs overlap regions in pipeline processing of the divided image. More specifically, three, first to third storage areas are provided. In the pipeline processing, an input image is written in the first storage area. At the same time, stored divided image data and overlap region images are read out from the remaining second and third storage areas, and image processing is performed. This makes it possible to read out the divided image data and the overlap region images without any influence of the writing of the input image.

In the technique disclosed in literature 1, however, when writing divided images in the DRAM, reading out them from the DRAM, and performing filter processing in divisional pipeline processing, the DRAM access data amount increases. More specifically, overlap regions necessary for the filter processing need to be written in the DRAM in each divided image processing, resulting in an increase in the DRAM access data amount and influence on the data processing speed.

In the technique disclosed in literature 2, when a plurality of overlap regions need to be added to, for example, the left and right ends (or upper and lower ends) of a divided image, it may be impossible to perform correct filter processing because of the configuration using three storage areas. In addition, since unnecessary image data other than the overlap regions also need to be held in the storage areas together with the overlap region images, a large storage area capacity is required. Furthermore, the divided images and the overlap region images need to be stored in different storage areas. In general, the horizontal size of an overlap region at the time of horizontal divisional processing is small. For this reason, when a DRAM is used as the storage area, short burst access to the DRAM frequently takes place. When short burst access to the DRAM frequently occurs, the command overhead increases, and the data processing speed thus lowers.

SUMMARY OF THE INVENTION

This specification provides a technique of improving the image processing speed by implementing efficient access to a buffer memory while suppressing the access count.

According to an aspect of this disclosure, there is provided an image processing apparatus comprising: a plurality of image processing units each configured to process image data including a plurality of portions, the plurality of portions including regions overlapping each other, the plurality of image processing units including a first image processing unit configured to perform first image processing using the portion as a unit, and a second image processing unit configured to perform second image processing using the portion as a unit for the image data processed by the first image processing unit, and the plurality of portions including a first portion and a second portion to be processed next to the first portion; a memory; and a controller configured to write the image data processed by the first image processing unit in the memory, and read out the image data stored in the memory and transfer the image data to the second image processing unit, the controller writing, out of the image data of the second portion output from the first image processing unit, the image data of a region other than a region overlapping the first portion at an address that continues from the address of the image data of the overlap region in the image data of the first portion output from the first image processing unit, and reading out the image data of the second portion including the image data of the overlap region from the memory and transferring the image data to the second image processing unit.

According to the present invention, it is possible to improve the image processing speed by implementing efficient access to a buffer memory while suppressing the access count.

Further features of the present invention will become apparent from the following description of exemplary embodiments (with reference to the attached drawings).

BRIEF DESCRIPTION OF THE DRAWINGS

FIGS. 9A to 9C are views showing the DRAM access sequences of the image processing apparatus according to the second embodiment;

FIG. 10 is a block diagram showing the arrangement of a data-transfer controlling unit according to the third embodiment;

FIGS. 11A to 11C are views showing the DRAM access sequences of the image processing apparatus according to the third embodiment; and FIGS. 12A and 12B are flowcharts showing the processing procedure of DRAM access of partial images according to the third embodiment.

DESCRIPTION OF THE EMBODIMENTS

The embodiments of the present invention will now be described in detail with reference to the accompanying drawings.

First Embodiment

Figure 2:
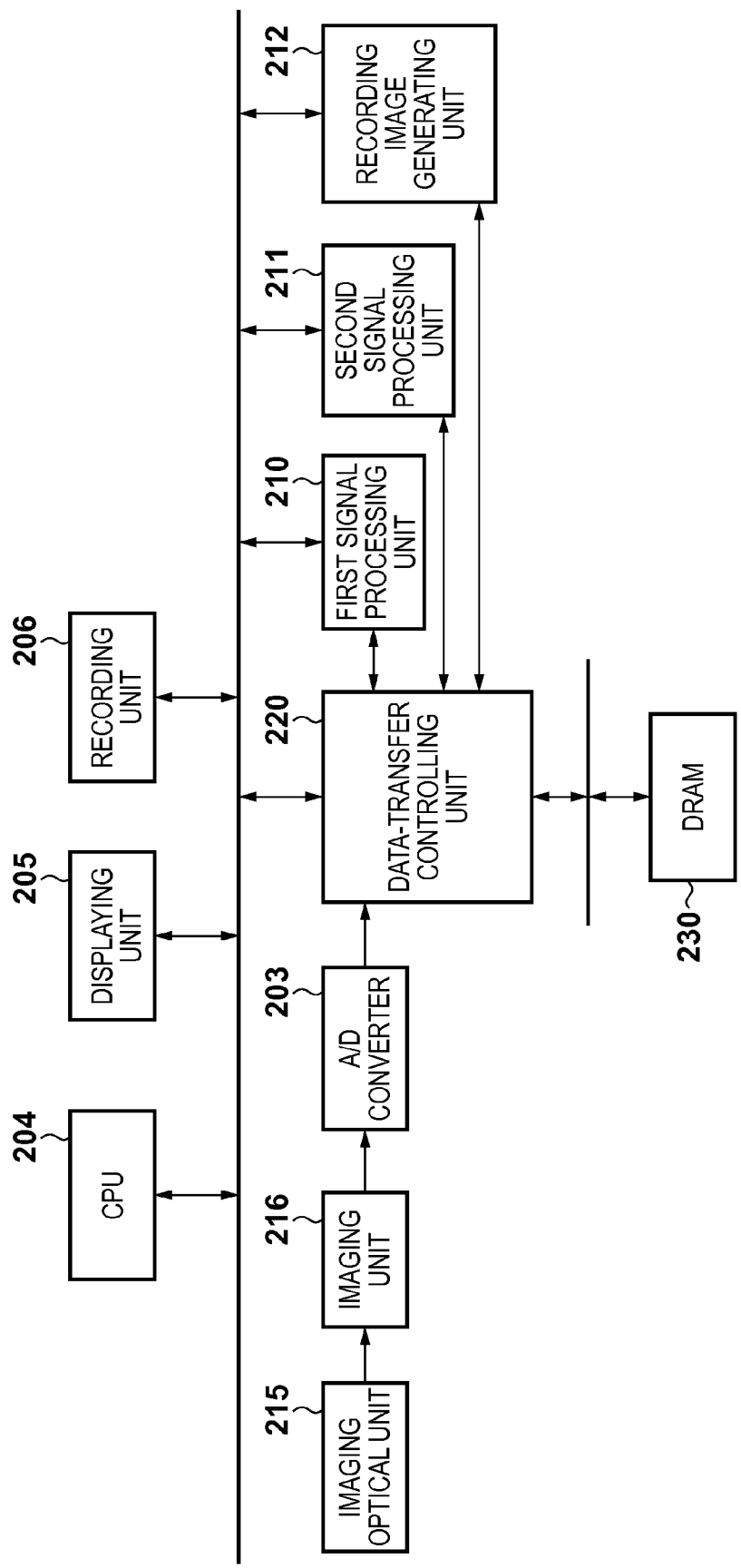
FIG. 2 is a block diagram showing the arrangement of the image processing apparatus according to the embodiment.

FIG. 2 is a block diagram showing the arrangement of an image processing apparatus according to the first embodiment. In the first embodiment, the image processing apparatus is applied to a digital camera.

Referring to FIG. 2, an imaging optical unit 215 is formed from a lens, a stop, and the like and adjusts focus and exposure. An imaging unit 216 such as a CCD converts an optical image into an electrical signal. An A/D converter 203 converts an analog image signal from the imaging unit 216 into digital image data. A DRAM 230 functions as a buffer memory to temporarily store data and also to do various kinds of processing. A data-transfer controlling unit 220 intervenes between a plurality of signal processing units and controls image data writing/reading in/from the DRAM 230. A CPU 204 performs various kinds of control via a bus. A first signal processing unit 210 and a second signal processing unit 211 perform various kinds of image processing (noise reduction, distortion correction, rotation, and the like) such as noise reduction processing for image data. Each of the first signal processing unit 210 and the second signal processing unit 211 performs image processing including filter processing for image data of pixels adjacent in the vertical direction. To do this, each of the signal processing units 210 and 211 includes line memories capable of storing image data of horizontal pixels of a partial image (to be described later) as many as the number of lines necessary for filter processing. In the first embodiment, image data (to be referred to as partial image data hereinafter) including part of the image data of one original frame and having regions overlapping each other are generated from the image of the one frame. The first signal processing unit 210 performs distortion correction processing for each of the generated partial image data and writes the result in the DRAM 230. The second signal processing unit 211 reads out, from the DRAM 230, the partial image data that is the processing result of the first signal processing unit 210, and performs filter processing for noise reduction. Note that the types of processing of the first signal processing unit 210 and the second signal processing unit 211 described here are merely examples, and the present invention is not limited to these.

A recording image generating unit 212 generates image data to be recorded in a recording medium (not shown) by a recording unit 206. The recording image generating unit 212 includes an encoding circuit. A displaying unit 205 is formed from a liquid crystal monitor or the like that displays image data generated by the second signal processing unit 211. Note that a detachable memory card is used as the recording medium, but the type is not particularly limited.

Figure 3:
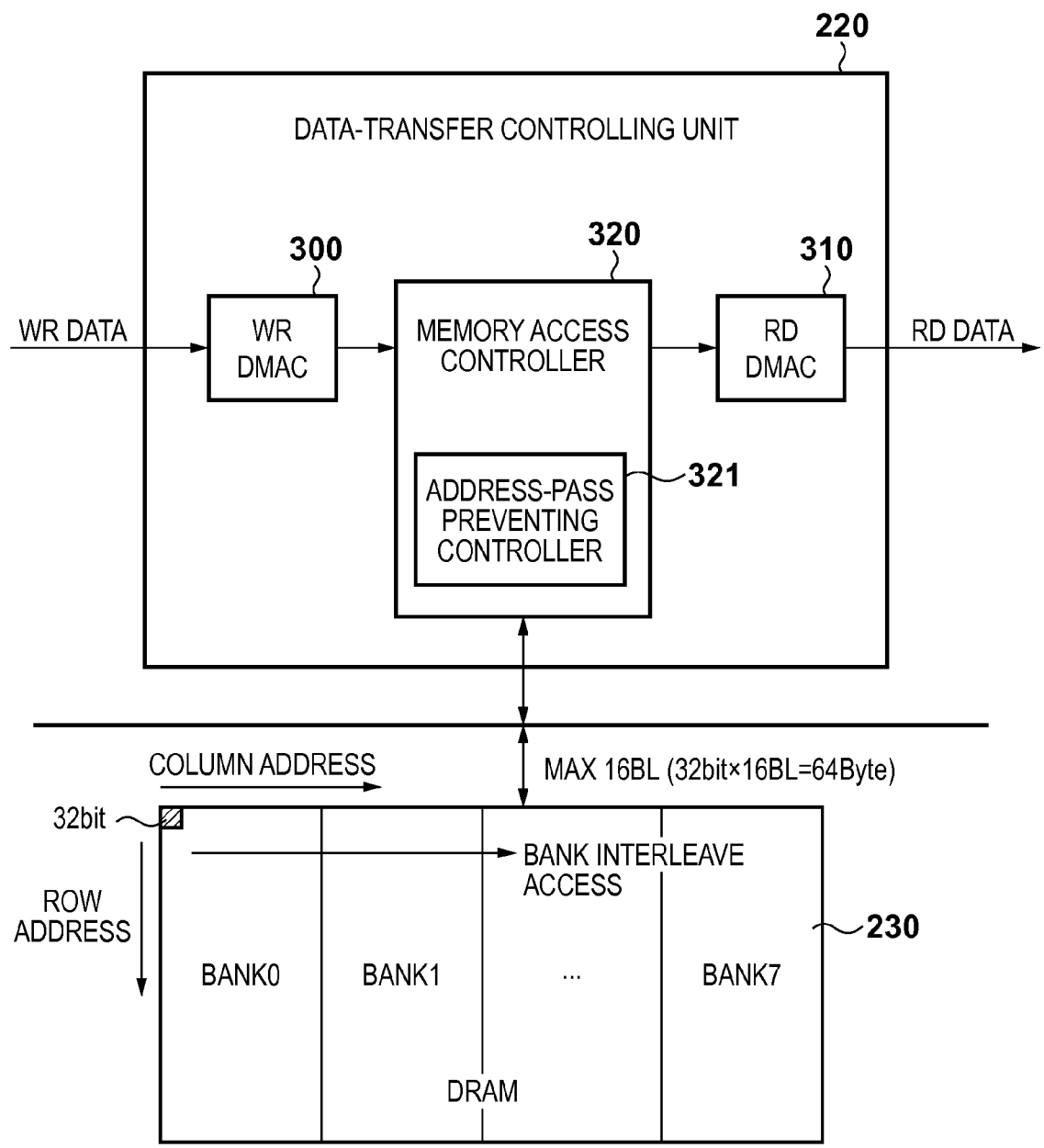
FIG. 3 is a block diagram of a data-transfer controlling unit according to the first and second embodiments.

FIG. 3 is a block diagram showing the arrangement of the data-transfer controlling unit 220 according to the first embodiment. A WRDMAC (Write Direct Memory Access Controller) 300 controls transfer for image data write in the DRAM 230. A RDDMAC (Read Direct Memory Access Controller) 310 controls transfer for image data load from the DRAM 230. In this embodiment, the WRDMAC 300 and the RDDMAC 310 are provided for the first signal processing unit 210 and the second signal processing unit 211, respectively. A memory access controller 320 controls transfer of a writing/reading command or the like to the DRAM 230 in response to a request from the WRDMAC 300 or the RDDMAC 310. Reference numeral 321 denotes an address-pass preventing controller. The address-pass preventing controller 321 controls to prevent an address accessed by a DMAC that has started access to the DRAM 230 first from being passed by an address accessed by a DMAC that has started access next. In the first embodiment, the WRDMAC 300 is set as the DMAC that starts access to the DRAM 230 first, and the RDDMAC 310 is set as the DMAC that starts access next. That is, the address-pass preventing controller 321 sets to prevent the access address of the RDDMAC 310 to the DRAM 230 from passing the access address of the WRDMAC 300 to the DRAM 230. More specifically, when the access address of the RDDMAC 310 to the DRAM 230 is equal to or larger than the access address of the WRDMAC 300 to the DRAM 230, access from the RDDMAC 310 to the DRAM 230 is prohibited (or paused). This allows the RDDMAC 310 to reliably load only image data written in the DRAM 230 by the WRDMAC 300.

In the first embodiment, the address-pass preventing control is applied to start read from the DRAM 230 by the second signal processing unit 211 immediately after the start of writing in the DRAM 230 by the first signal processing unit 210, thereby shortening the time needed for image processing.

The DRAM 230 according to the first embodiment has an 8-BANK configuration with 32-bit addresses. The DRAM 230 can continuously transfer 16 burst (32 bits×16 BL=64 bytes) data at maximum by issuing one access request command. When accessing the DRAM 230, if writing by the WRDMAC 300 and read by the RDDMAC 310 are performed for one bank, a precharge command needs to be issued at high possibility in every access. In this case, since it is impossible to access the same bank during issuance of the precharge command, the access efficiency to the DRAM 230 lowers. Hence, in the first embodiment, when processing a partial image as will be described later, access to image data is performed by bank interleave control upon writing one partial image in the DRAM 230. When bank interleave control is performed, the precharge command to another bank can be issued during the period of data access to one bank. It is therefore possible to suppress the time required for image data write short and efficiently access the DRAM 230.

Figure 4:
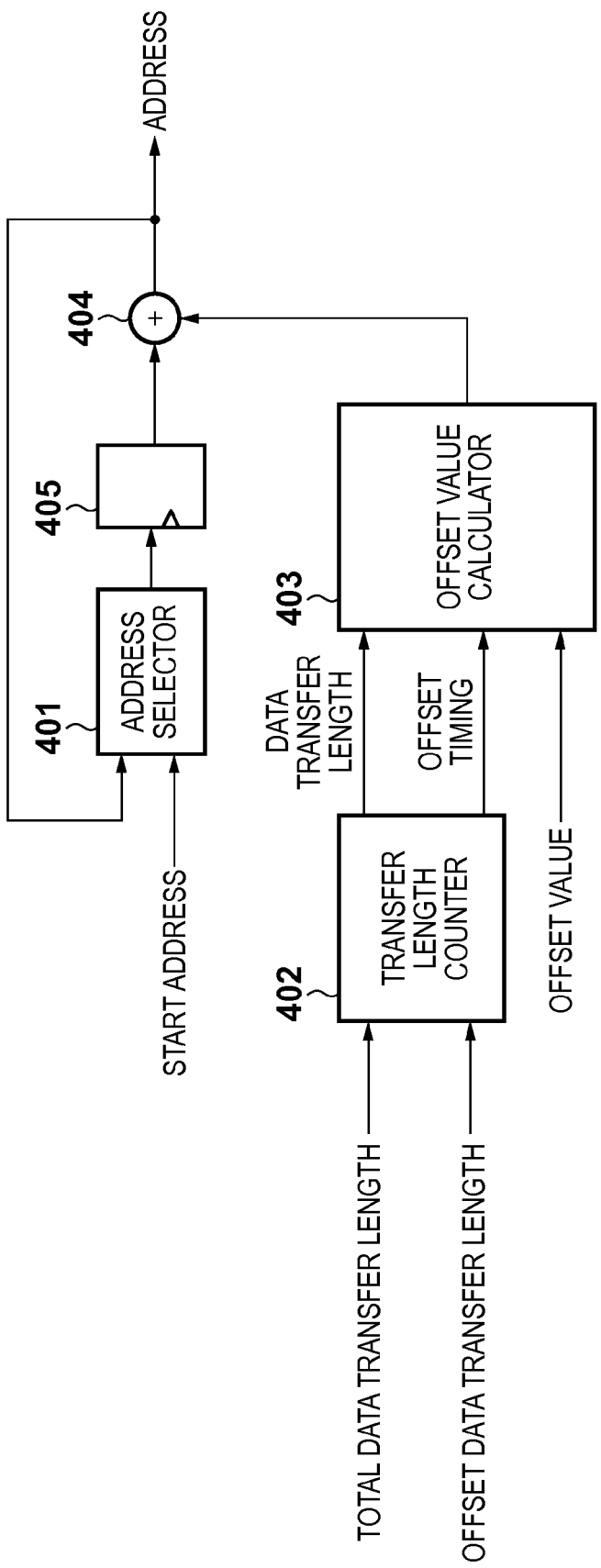
FIG. 4 is a block diagram showing the arrangement of the address controller of a DMAC according to the embodiment.

FIG. 4 is a block diagram of the address controller of the WRDMAC 300 or the RDDMAC 310 according to the first embodiment, which calculates a data storage address. The address controller shown in FIG. 4 is provided in each DMAC, that is, each of the WRDMAC 300 and the RDDMAC 310. The WRDMAC 300 and the RDDMAC 310 have an offset jump function of jumping a data storage address value after transferring a predetermined amount of data. Upon receiving a write request from the first signal processing unit 210 or a read request from the second signal processing unit 211, the CPU 204 sets a start address, a total data transfer length, an offset data transfer length, and an offset value in the WRDMAC 300 or the RDDMAC 310. An address selector 401 selects the start address set in the CPU 204 as an address value at the start of data access. A transfer length counter 402 counts the transfer data length and outputs an offset timing signal to an offset value calculator 403 every time data of the offset transfer length set in the CPU 204 is transferred. In addition, based on the total data transfer length and the offset data transfer length set in the CPU 204, the transfer length counter 402 outputs, to the offset value calculator 403, a data transfer length to be transferred to the DRAM 230 by one access responding to one transfer request. Upon receiving the offset timing signal from the transfer length counter 402, the offset value calculator 403 outputs the offset value set in the CPU 204. At other timings, the offset value calculator 403 outputs the data transfer length output from the transfer length counter 402. An adder 404 adds the value output from the offset value calculator 403 to the current address value to generate an address value to store next data. Every time data is transferred, the address selector 401 selects the value output from the adder 404 as the current address value, and a flip-flop 405 holds the value.

Figure 5:
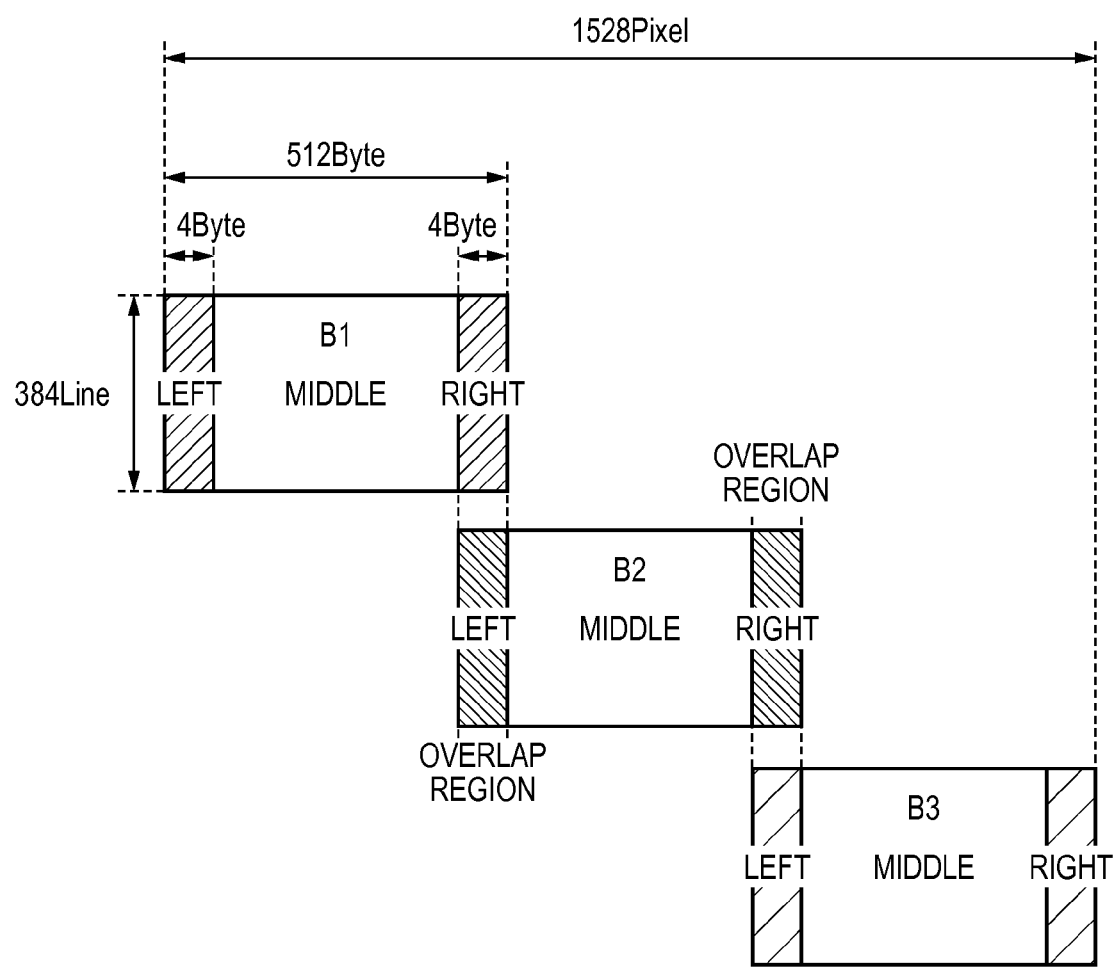
FIG. 5 is a view showing the relationship between partial images and overlap regions to be processed by the image processing apparatus according to the first embodiment.

FIG. 5 is a view showing image data to be processed by the image processing apparatus according to the first embodiment. In this embodiment, one pixel of image data obtained by imaging is 1-byte digital data. The horizontal size of one frame is 1,528 pixels, and the vertical size is 384 pixels (lines). In the first embodiment, three portions each including part of the original image data are generated from the image data of one frame of the processing target, and image processing is performed for the image data of each portion. At this time, partial images are generated such that the number of horizontal pixels equals the number of vertical pixels in each portion. Additionally, each partial image is generated such that the image data of its partial region overlaps a partial image including an image adjacent to the partial image in the one original frame. The region that overlaps the adjacent partial image will be referred to as an overlap region. Note that three partial images are generated from one frame here. However, any other number of partial images may be generated. The number of horizontal pixels of each partial image may be appropriately changeable in accordance with the number of pixels of the overlap region. Referring to FIG. 5, "left" indicates the overlap region at the left end of one partial image; "right", the overlap region at the right end; and "middle", a non-overlap region sandwiched between the overlap region at the left and that at the right end.

In this embodiment, the size of one partial image is 512 pixels in the horizontal direction and 384 pixels in the vertical direction. Since one pixel is 1-byte data, the data amount of each partial image is 512 bytes in the horizontal direction× 384 pixels in the vertical direction. Four pixels are needed for filter processing at each of the left and right ends. Since one pixel is 1 byte in this embodiment, the size of the overlap region is 4 bytes in the horizontal direction. Letting N be the number of pixels overlapping in the horizontal direction and M be the number of bytes of one pixel, the number of bytes of the overlap region can be defined as N×M. When generating three partial images from one frame, the partial images are generated such that one of the partial images includes the left end of the one original frame, and another partial image includes the right end of the one original frame. The right end overlap region data of a first partial image B1 and the left end overlap region data of a second partial image B2 are identical image data. The right end overlap region data of the second partial image B2 and the left end overlap region data of a third partial image B3 are also identical image data.

Note that each partial image is generated by controlling the read address from the DRAM 230 when the first signal processing unit 210 reads out image data from the DRAM 230 and processes it.

Figure 6:
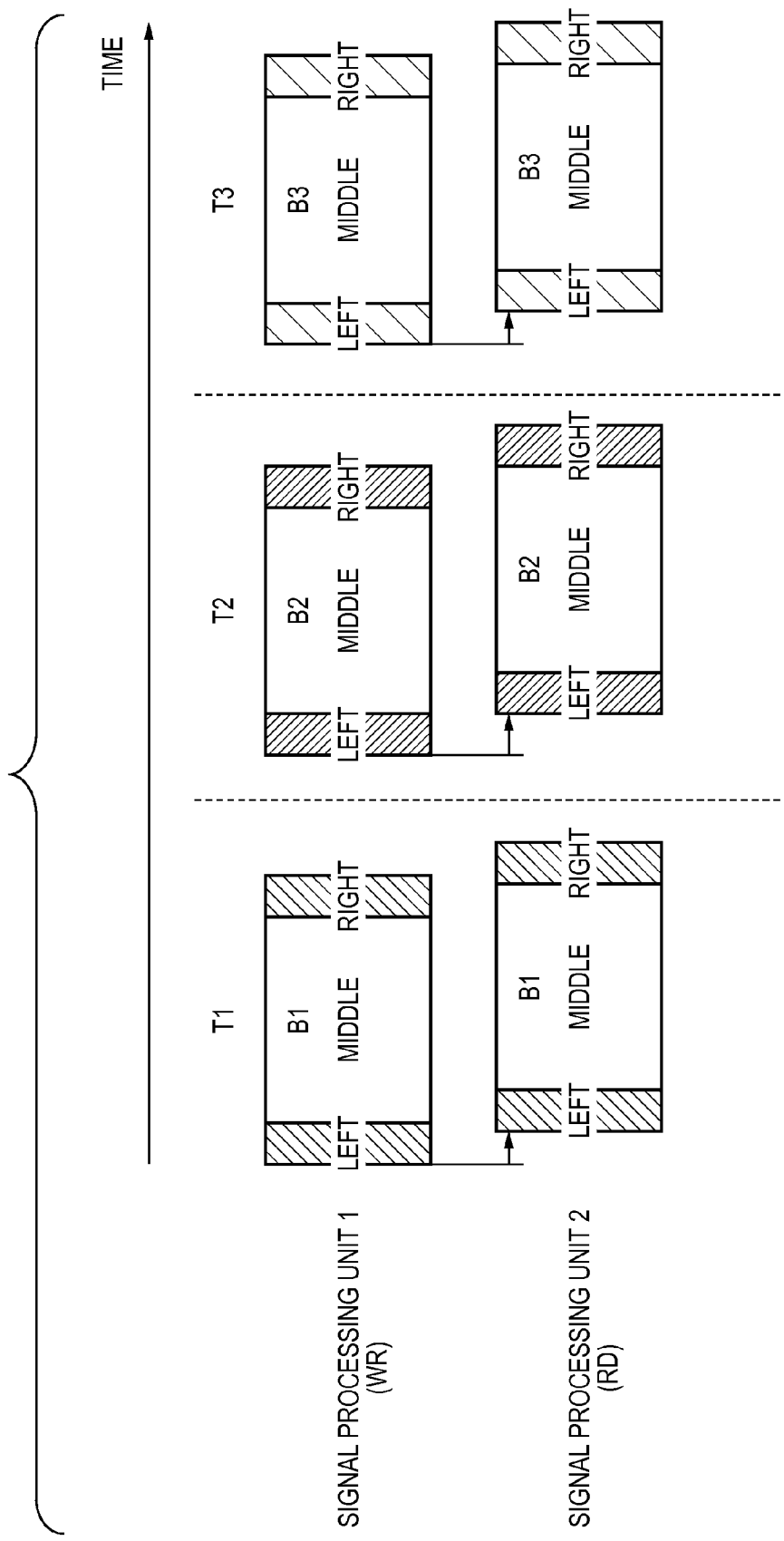
FIG. 6 is a view showing the order of divisional image processing of the image processing apparatus.

FIG. 6 is a view showing the order of processing for the partial images by the image processing apparatus according to the first embodiment. At time T1, the first signal processing unit 210 processes the first partial image B1 and writes the processed partial image in the DRAM 230. Immediately after the first signal processing unit 210 starts writing the first partial image B1 in the DRAM 230, the second signal processing unit 211 reads out, from the DRAM 230, the first partial image B1 written by the first signal processing unit 210 and performs image processing (filter processing). In the first embodiment, the address-pass preventing controller 321 controls to prevent the second signal processing unit 211 from reading out the partial image of the processing target before the first signal processing unit 210 completes writing of the partial image of the processing target. Address-pass control is thus performed such that after the first signal processing unit 210 starts writing the partial image, the second signal processing unit 211 reads out the partial image in parallel to the write, thereby shortening the processing time of the partial image. When the read of the first partial image B1 by the second signal processing unit 211 is completed, at time T2, the first signal processing unit 210 processes the second partial image B2 and writes the processed partial image B2 in the DRAM 230. After the first signal processing unit 210 starts writing the second partial image B2 in the DRAM 230, the second signal processing unit 211 reads out, from the DRAM 230, the second partial image B2 written by the first signal processing unit 210 and performs image processing. In this case as well, the address-pass preventing controller 321 controls to prevent the second signal processing unit 211 from reading out the partial image of the processing target before the first signal processing unit 210 completes writing of the partial image B2 of the processing target. In the same way as described above, when the read of the second partial image B2 by the second signal processing unit 211 is completed, at time T3, the first signal processing unit 210 processes the third partial image B3 and writes the processed partial image B3 in the DRAM 230. After the first signal processing unit 210 starts writing the third partial image B3 in the DRAM 230, the second signal processing unit 211 reads out, from the DRAM 230, the third partial image B3 written by the first signal processing unit 210 and performs image processing in parallel to the write. In this case as well, the address-pass preventing controller 321 controls to prevent the second signal processing unit 211 from reading out the partial image of the processing target before the first signal processing unit 210 completes writing of the partial image B3 of the processing target.

Figure 1:
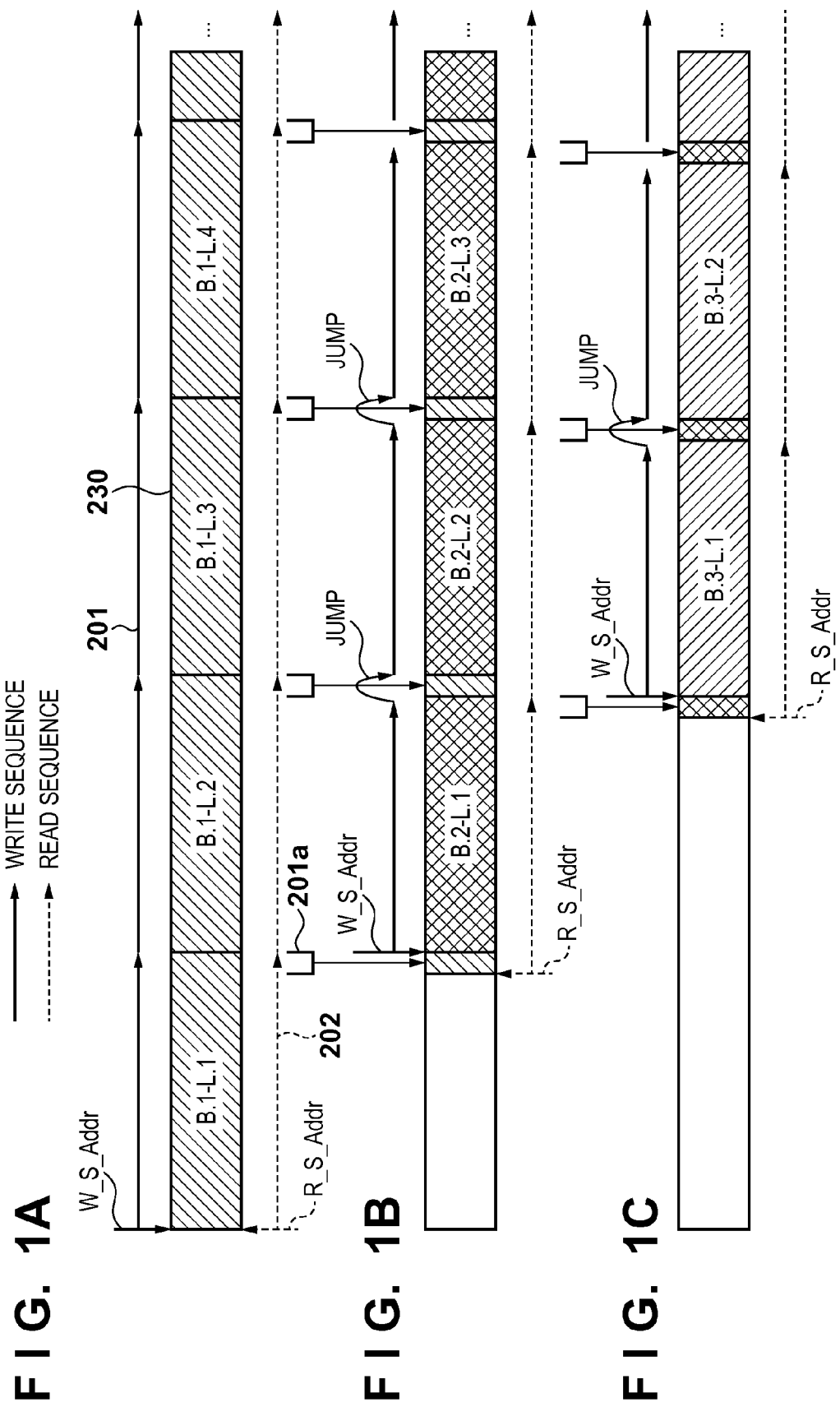
FIGS. 1A to 1C are views showing the DRAM access sequences of an image processing apparatus according to the first embodiment.

FIGS. 1A to 1C are views showing the access pattern of the image processing apparatus according to the first embodiment to the DRAM 230.

FIG. 1A shows the write sequence of the first signal processing unit 210 to the DRAM 230 and the read sequence of the second signal processing unit 211 from the DRAM 230 at the time T1 in FIG. 6.

In this embodiment, one partial image is formed from 512 bytes in the horizontal direction and 384 pixels in the vertical direction. Upon receiving an image data write request from the first signal processing unit 210, the CPU 204 sets, in the WRDMAC 300 of the data-transfer controlling unit 220, the first column address of a predetermined row address in a predetermined bank of the DRAM 230 as a write start address W_S_Addr. The CPU 204 also sets 196,608 bytes (=512× 384) as the total data transfer length, 0 as the offset data transfer length, and 0 as the offset, and causes the first signal processing unit 210 to start writing of image data. Note that when the offset data length is 0, the write address does not jump and is sequentially updated in ascending order. The CPU 204 also sets, in the RDDMAC 310 of the data-transfer controlling unit 220, the first column address of a predetermined row address in a predetermined bank of the DRAM 230, that is, the row address at which the image data is written by the first signal processing unit 210 as a read start address R_S_Addr. The CPU 204 sets 196,608 bytes (=512×384) as the total data transfer length, 0 as the offset data transfer length, and 0 as the offset, and causes the second signal processing unit 211 to start read of image data.

Consequently, as shown in FIG. 1A, the data of the first partial image B1 processed by the first signal processing unit 210 is stored without interruption from the first column address of a predetermined row address in one bank of the DRAM 230, as indicted by a sequence 201. Upon reaching the final column address in one bank halfway during writing of the data of one partial image, the memory access controller 320 switches the write destination to another bank and continues writing of the image data. Note that in FIGS. 1A to 1C, image data of a line y (y is one of 1 to 384) of a partial image Bx (x is one of 1 to 3) is expressed as "B.x–L.y". As described above, the DRAM 230 according to the embodiment can transfer 64-byte data in the 16 burst length at maximum. One line of each partial image includes 512 bytes. For this reason, when transferring image data of one line, 16 burst transfer is performed eight times. That is, writing the partial image B1 in the DRAM 230 can be implemented only by repeating data transfer in the maximum burst length.

In addition, continuous read addresses are designated from the first column address of a predetermined row address in a predetermined bank of the DRAM 230, and image data is read out to the second signal processing unit 211 and undergoes filter processing, as indicated by a sequence 202. Reading out the partial image B1 from the DRAM 230 can also be implemented only by data transfer in the maximum burst length.

FIG. 1B shows the write and read sequences of the second partial image B2. As already described, the partial images B1 and B2 have portions that overlap each other. That is, the 4-byte image at the right end of the partial image B1 and the 4-byte image at the left end of the partial image B2 are identical images. For the 4-byte data at the left end of each line of the second partial image B2, filter processing is executed using data (201a) already stored in the DRAM 230. The first signal processing unit 210 reads the image data of the second partial image B2 including the 4-byte data at the left end and performs the process. The first signal processing unit 210 does not transfer the 4-byte data at the left end of the processed second partial image B2 and transfers the image data of the second partial image B2 other than the 4-byte data at the left end. Transfer of the overlap portion from the first signal processing unit 210 to the DRAM 230 is thus omitted to shorten the time needed to write the image data in the DRAM 230 for processing of the partial image B2.

More specifically, upon receiving the write request of the partial image B2 from the first signal processing unit 210, the CPU 204 sets, in the WRDMAC 300 of the data-transfer controlling unit 220, not the first address of a predetermined row address in a predetermined bank of the DRAM 230 but an address immediately after the address at which the 4-byte image data at the right end of line 1 of the partial image B1 is stored as the write start address W_S_Addr of the partial image B2. The CPU 204 also sets, in the WRDMAC 300 of the data-transfer controlling unit 220, 195,072 bytes (=(512– 4)×384) as the total data transfer length, 508 as the offset data transfer length, and 4 as the offset, and causes the first signal processing unit 210 to start writing of image data. As a result, every time 508-byte image data is written, adding 4 bytes to the write address is repeated. Consequently, the partial image B2 is stored in the DRAM 230 while 4-byte data at the right end of each line of the partial image B1 remains in the DRAM 230 without being overwritten. In this embodiment, the 4-byte data at the right end of each line of the partial image B1, which remains stored in the DRAM 230, is used again for filter processing as 4-byte data at the left end of the partial image B2. When transferring each line of the partial image B2 from the first signal processing unit 210 to the DRAM 230, 508 bytes out of the 512-byte image data are transferred. At the time of transfer, 16 burst transfer is performed seven times, and 15 burst transfer is performed once. That is, the number of times of short burst transfer, which is executed to transfer the data of one line, is suppressed to one, and the remaining data is transferred in the maximum burst length.

On the other hand, when reading out the partial image B2 from the DRAM 230 to the second signal processing unit 211, the CPU 204 sets, in the RDDMAC 310 of the data-transfer controlling unit 220, the start of the address at which the 4-byte data at the right end of line 1 of the partial image B1 is stored as the read start address R_S_Addr. The CPU 204 also sets, in the RDDMAC 310 of the data-transfer controlling unit 220, 196,608 bytes (=512×384) as the total data transfer length, 0 as the offset data transfer length, and 0 as the offset. That is, when reading out the partial image B2 from the DRAM 230 and transferring it to the second signal processing unit 211, only the read start address position changes, and the remaining parameters of transfer remain unchanged as compared to those in reading out the image data of the partial image B1. Hence, transferring the partial image B2 to the second signal processing unit 211 can be implemented by repeating only 16 burst transfer, that is, transfer in only the maximum burst length.

FIG. 1C shows the write and read sequences of the partial image B3. The write and read of the partial image B3 are executed like the write and read of the partial image B2. That is, processing is performed using 4-byte data at the right end of one line of the partial image B2, which is already stored in the DRAM 230, as 4-byte data at the left end of one line of the partial image B3. Only the write start address W_S_Addr and the read start address R_S_Addr are different from those in the write and read of the partial image B2.

When the above-described control is performed, the access data amount to the DRAM 230 can be reduced while suppressing the short burst access count. It is therefore possible to shorten the processing time of the partial images.

In this embodiment, one partial image is written at the same row address (page) of one bank. After the partial image is written up to the final column address of the same bank, the same row address of another bank is designated as the write designation, and the write is continued. In this way, one partial image is written at the same row address of a plurality of banks by bank interleave control. The second and third partial images are partially overwritten at the write address of the first partial image.

Figure 7:
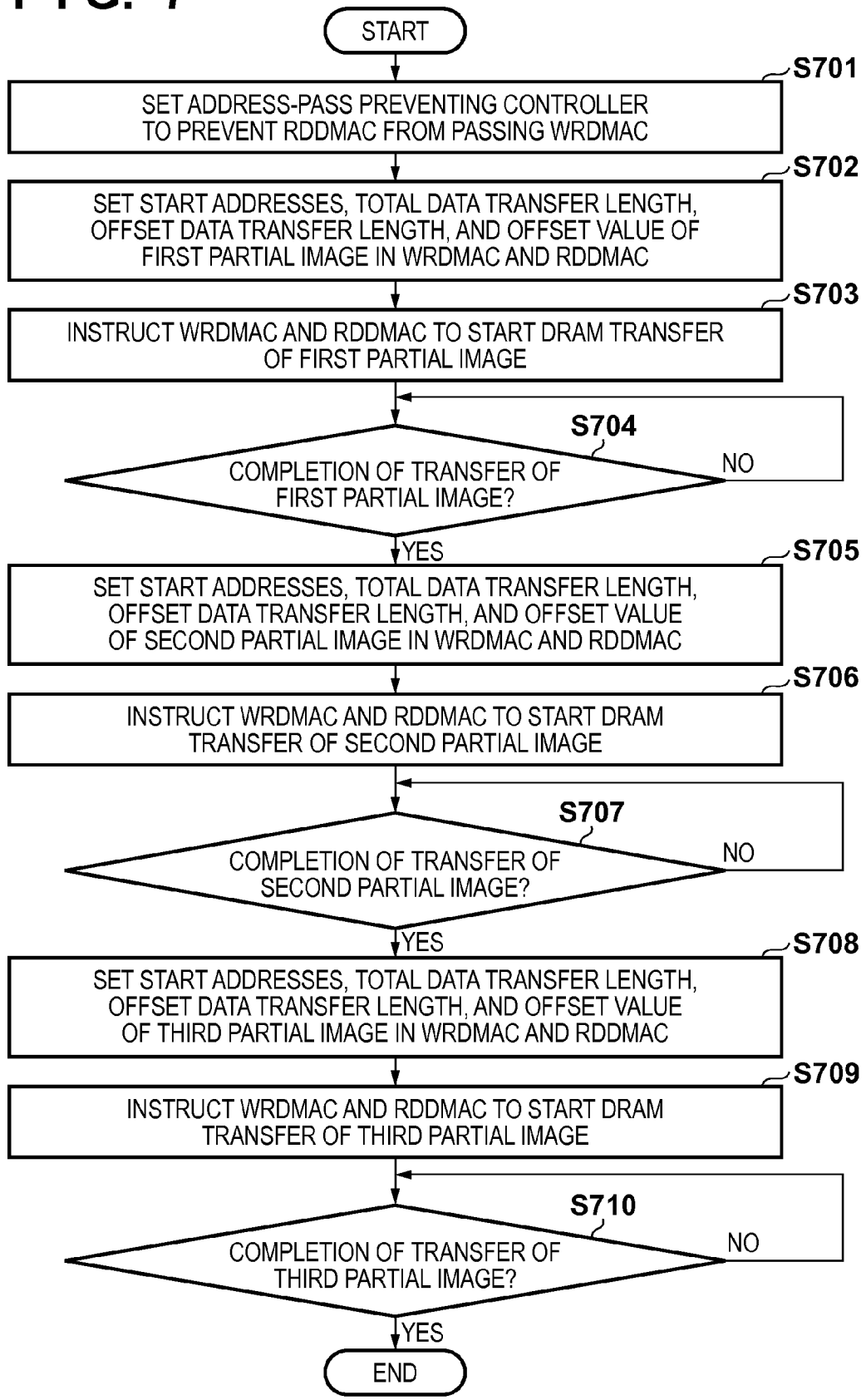
FIG. 7 is a flowchart showing the processing procedure of DRAM access of partial images according to the embodiment.

FIG. 7 is a flowchart showing the procedure of access processing of a partial image to the DRAM 230 by the CPU 204 according to the first embodiment.

The CPU 204 sets the address-pass preventing controller 321 of the data-transfer controlling unit 220 to prevent the read address of the RDDMAC 310 from the DRAM 230 from passing the write address of the WRDMAC 300 to the DRAM 230 during the period of transfer of one partial image (step S701). The CPU 204 sets the start addresses, the total data transfer length, the offset data transfer length, and the offset value of the first partial image B1 in the WRDMAC 300 and the RDDMAC 310 (step S702). The CPU 204 instructs the WRDMAC 300 and the RDDMAC 310 to start writing/reading of the partial image B1 in/from the DRAM 230 (step S703). When the write of all image data of the partial image B1 in the DRAM 230 is completed (step S704), the CPU 204 sets the start addresses, the total data transfer length, the offset data transfer length, and the offset value of the second partial image B2 in the WRDMAC 300 and the RDDMAC 310 (step S705). The CPU 204 instructs the WRDMAC 300 and the RDDMAC 310 to start writing/reading of the partial image B2 in/from the DRAM 230 (step S706). When the write of all image data of the partial image B2 in the DRAM 230 is completed (step S707), the CPU 204 sets the start addresses, the total data transfer length, the offset data transfer length, and the offset value of the third partial image B3 in the WRDMAC 300 and the RDDMAC 310 (step S708). The CPU 204 instructs the WRDMAC 300 and the RDDMAC 310 to start writing/reading of the partial image B3 in/from the DRAM 230 (step S709). When the write of all image data of the partial image B3 in the DRAM 230 is completed, the CPU 204 ends the processing (step S710).

As described above, according to the first embodiment, when generating a plurality of partial images from the image of one frame and processing them, the image data of an overlap region is transferred to the DRAM only once. This can decrease the access data amount of each partial image data to the DRAM 230. Additionally, the count of short burst access to the DRAM 230 can be suppressed by changing the access address to the DRAM 230 for each partial image. This can improve the access efficient to the DRAM 230 and shorten the processing time of the partial images.

Note that in the first embodiment, an example has been described in which three partial images are generated from the image of one frame of a processing target. However, the number of partial images is not limited to three as long as a plurality of partial images are generated from one frame. More specifically, the number of partial images (blocks) is expressed as N in general. When storing data of the ith block in the DRAM 230, the data of the overlap region of the immediately preceding (i−1)th block is regarded as the data of the overlap region at the left end of the ith block, and the remaining data is transferred to the DRAM 230.

In this embodiment, the partial images are configured to include different pixel portions of the same horizontal line. However, each partial image may include a whole horizontal line, and the horizontal lines included in the partial images may be different from each other. In the first embodiment, an example has been described in which one partial image includes 512 bytes in the horizontal direction×384 pixels in the vertical direction, and an overlap region has a size of 4 bytes. However, the number of horizontal pixels of each partial image or the size of the overlap region may have a different value. It should be understood that the above-described arrangement is merely an example.

In this embodiment, the DRAM configuration defines a 32-bit address, eight banks, and data transfer in 16 burst (32 bits×16 BL=64 bytes) length at maximum. However, another DRAM configuration may be employed, as a matter of course.

Second Embodiment

The second embodiment will be described below. The arrangement of an image processing apparatus according to the second embodiment, the arrangement of a data-transfer controlling unit 220, the arrangement of the address controller of each DMAC, and the processing order of partial images in the image processing apparatus are the same as in the first embodiment, and a description thereof will be omitted.

The second embodiment is different from the first embodiment in the size of the partial image to be processed by the image processing apparatus and the procedure of access from the image processing apparatus to the DRAM. In the second embodiment, access control to a DRAM 230 is performed so as to decrease the access data amount to the DRAM 230 and implement efficient access to the DRAM 230 even when the number of horizontal pixels of at least one of the plurality of partial images is different from that of the remaining partial images. More specifically, the positions of start addresses W_S_Addr and R_S_Addr of each line to the DRAM 230 are decided based on the maximum one of the horizontal sizes of the partial images. An example will be described below.

Figure 8:
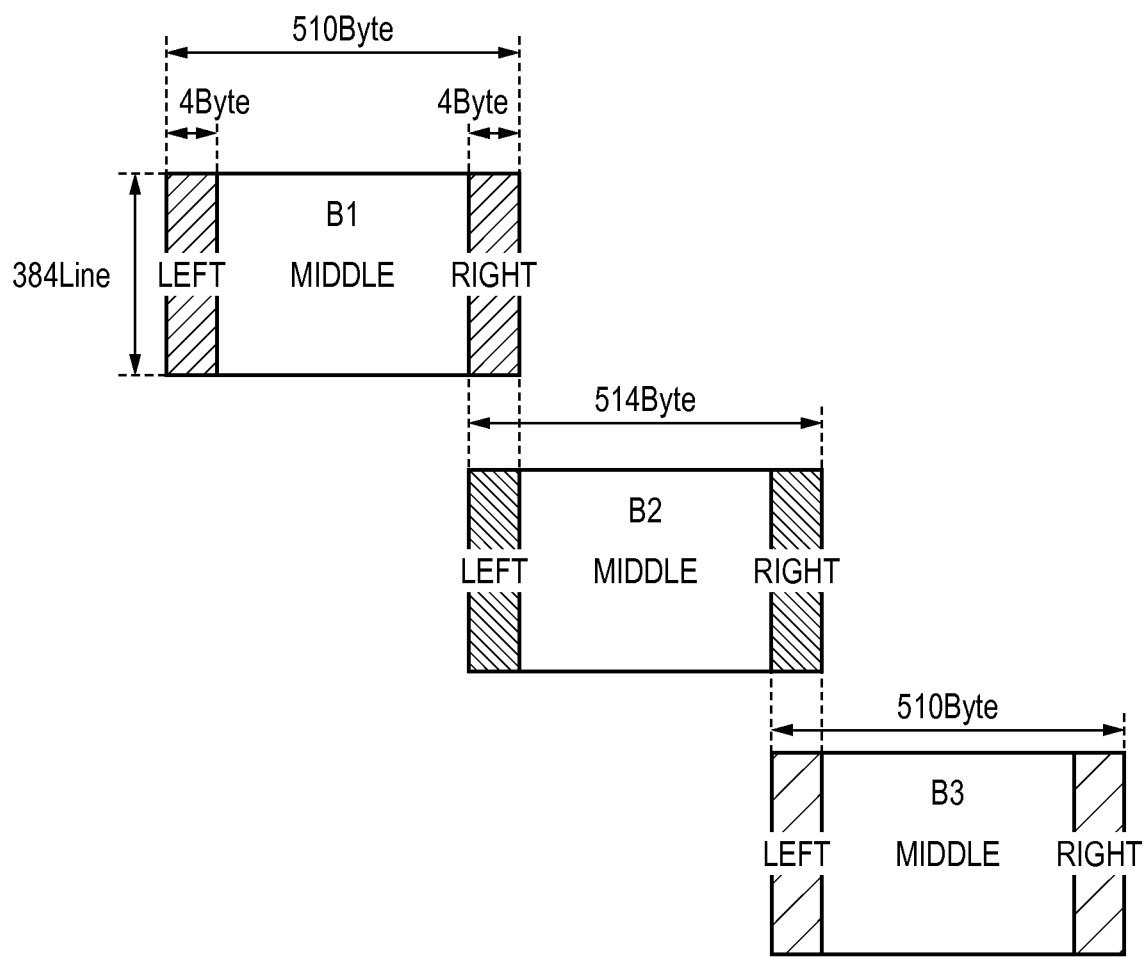
FIG. 8 is a view showing the relationship between the partial image size and overlap regions to be processed by an image processing apparatus according to the second and third embodiments.

FIG. 8 is a view showing the sizes of partial images to be processed by the image processing apparatus according to the second embodiment. In the second embodiment, three partial images are generated from the image data of one frame. One of the partial images has a horizontal size different from that of the remaining partial images. The data size of a first partial image B1 and a third partial image B3 is 510 bytes (pixels) in the horizontal direction×384 lines in the vertical direction. They have overlap regions at the left and right ends, which have a horizontal size of 4 bytes and are needed in filter processing. The data size of a second partial image B2 is 514 bytes in the horizontal direction×384 lines in the vertical direction. The partial image B2 has overlap regions at the left and right ends, which have a horizontal size of 4 bytes and are needed in filter processing. Hence, in the second embodiment, the interval of addresses of lines to the DRAM 230 is set to 514 that is the maximum size.

The right end overlap region of the partial image B1 and the left end overlap region of the partial image B2 are identical image data. The right end overlap region data of the partial image B2 and the left end overlap region data of the partial image B3 are also identical image data.

FIGS. 9A to 9C are views showing the access pattern of the image processing apparatus according to the second embodiment to the DRAM 230.

FIG. 9A shows access of transfer data when a first signal processing unit 210 and a second signal processing unit 211 process the first partial image B1. In this case, all data of the partial image B1 including the overlap regions at the left and right ends is written from the first signal processing unit 210 to the DRAM 230. In the second embodiment, after the image data of line 1 of the partial image B1 is written, the data-transfer controlling unit 220 jumps the write address by 4 bytes that is the horizontal size difference between the first partial image B1 and the second partial image B2 having the largest horizontal size. The data-transfer controlling unit 220 writes image data from line 2 in accordance with the same procedure. That is, every time 510-byte data is written, the write address repetitively jumps by the size of overlap, as indicated by a sequence 201 in FIG. 9A.

The data-transfer controlling unit 220 reads out the first partial image B1 written in the DRAM 230 by the first signal processing unit 210 and sends it to the second signal processing unit 211. At this time, the data-transfer controlling unit 220 reads out image data including the overlap regions at the left and right ends of the first partial image B1 from the DRAM 230 and sends it to the second signal processing unit 211. In the second embodiment, after the image data of line 1 is read out, the data-transfer controlling unit 220 jumps the read address by 4 bytes that is the horizontal size difference between the first partial image B1 and the second partial image B2, as indicated by a sequence 202 in FIG. 9A. Image data from line 2 is also read out in accordance with the same procedure.

FIG. 9B shows access of transfer data when the first signal processing unit 210 and the second signal processing unit 211 process the second partial image B2. In this embodiment as well, the second signal processing unit 211 performs the processing using 4-byte data at the right end of the first partial image B1 already stored in the DRAM 230 as 4-byte data at the left end of the second partial image B2. For this reason, the first signal processing unit 210 does not transfer the 4-byte data at the left end of the second partial image B2 and transfers the image data of the second partial image B2 other than the 4-byte data at the left end of the second partial image B2. Then, a CPU 204 controls a WRDMAC 300 of the data-transfer controlling unit 220 and writes the image data from the fifth byte of each line of the partial image B2 from an address immediately after the storage address of the 4-byte data at the right end of the first partial image B1. This prevents the image data of the left end overlap region of the partial image B2 from being repetitively written in the DRAM 230. It is therefore possible to suppress the data amount of image data transferred from the first signal processing unit 210 to the DRAM 230 and shorten the image processing time. The CPU 204 also controls the data-transfer controlling unit 220 to jump the write address by 4 bytes when writing of image data of one line of the partial image B2 is completed, and write the partial image B2 not to overwrite the right end overlap region of the partial image B1.

The CPU 204 sets the right end overlap region of line 1 of the partial image B1 in the data-transfer controlling unit 220 as the read start address R_S_Addr, reads out the image data from the DRAM 230, and sends it to the second signal processing unit 211. When transfer of the image data (514 bytes) from line 2 of the partial image B2 ends, the data-transfer controlling unit 220 sequentially transfers, from a subsequent position, the image data from line 2. When writing the partial image B1, the start write address of each line is decided in accordance with the horizontal size of the partial image B2. For this reason, when reading out the partial image B2, the image data of the partial image B2 including the overlap regions is read out from the DRAM 230 and transferred to the second signal processing unit 211 only by designating continuous read addresses without jumping the read address halfway. The partial image B2 can thus be read out from the DRAM 230 only by 16 burst transfer. As a result, since no short burst access occurs, efficient access to the DRAM 230 can be performed.

FIG. 9C shows access of transfer data when the first signal processing unit 210 and the second signal processing unit 211 process the third partial image B3. In this embodiment as well, the second signal processing unit 211 performs the processing using 4-byte data at the right end of the second partial image B2 written in the DRAM 230 as 4-byte data at the left end of the third partial image B3. For this reason, the first signal processing unit 210 does not transfer the 4-byte data at the left end of the third partial image B3 and transfers the image data of the third partial image B3 other than the 4-byte data at the left end of the third partial image B3. Then, the data-transfer controlling unit 220 writes image data from the fifth byte of each line of the partial image B3 from an address immediately after the storage address of the 4-byte data at the right end of the second partial image B2. The CPU 204 also sets the address at which the start of the overlap region of the right end of line 1 of the partial image B2 is stored in the data-transfer controlling unit 220 as the read start address, and controls to read out 510 bytes for each line. When the image data of one line is read out, the data-transfer controlling unit 220 jumps the read address by 4 bytes and reads out image data from line 2.

As a result, when generating a plurality of partial images having different horizontal sizes from the image of one frame and processing them, the transfer data amount of each partial image to the DRAM 230 can be decreased.

Note that in the second embodiment, three partial images are generated from the image of one frame. However, any other number of partial images may be generated. In the second embodiment, the size of the first partial image B1 and third partial image B3 is 510 bytes×384 lines, the size of the second partial image B2 is 514 bytes×384 lines, and the size of the overlap region is 4 bytes. However, other values may be set.

In the second embodiment, at the time of access of the first partial image B1 and the third partial image B3 to the DRAM 230, the write address is jumped when write of the data of one line is completed. However, the jump need not always be done upon completion of writing of the data of one line. For example, the write address is jumped by 4 bytes halfway through one line of the partial image B1. When writing the data of the partial image B2 in the DRAM 230, the address next to the storage address of the data at the right end of the partial image B1 is designated as the write start address. As described above, even when the write address is jumped halfway through one line, the time needed for data transfer to the DRAM 230 does not increase unless the number of times of jump increases.

Third Embodiment

The third embodiment will be described. The arrangement of an image processing apparatus according to the third embodiment, the arrangement of the address controller of each DMAC, the sizes of partial images to be processed by the image processing apparatus, and the processing order of partial images in the image processing apparatus are the same as in the second embodiment, and a description thereof will be omitted.

The third embodiment is different from the second embodiment in the arrangement of a data-transfer controlling unit 220, the DRAM access pattern of the image processing apparatus, and the DRAM access sequences of partial images. In the third embodiment, access to a DRAM 230 is controlled so as to suppress the count of short burst access to the DRAM 230 as compared to the second embodiment and implement efficient access to the DRAM 230 when the horizontal size difference between the partial images is equal to or smaller than a predetermined tolerance. In the third embodiment, the tolerance to the horizontal size difference of the partial images is 16 bytes. Since the horizontal size difference of the partial images according to this embodiment is 4 bytes which is less than the tolerance, the following control can be executed.

FIG. 10 is a block diagram showing the arrangement of the data-transfer controlling unit 220 according to the third embodiment. The arrangements of a WRDMAC 300, an RDDMAC 310, a memory access controller 320, an address-pass preventing controller 321, and the DRAM 230 are the same as in the first embodiment, and a description thereof will be omitted. Referring to FIG. 10, a pixel copying unit 301 can horizontally add pixels of a set data amount to an image to be written in the DRAM 230. A pixel cutting unit 311 can horizontally delete pixels of a set data amount from an image read out from the DRAM 230.

FIGS. 11A to 11C are views showing the access pattern of the image processing apparatus according to the third embodiment to the DRAM 230.

FIG. 11A shows access of transfer data to the DRAM 230 when a first signal processing unit 210 and a second signal processing unit 211 process the first partial image B1. The pixel copying unit 301 adds dummy pixels to each line data of the first partial image B1 including the overlap regions at the left and right ends and processed by the first signal processing unit 210. In this embodiment, 4-byte dummy pixels (1101 in FIG. 11A) corresponding to the horizontal size difference between the partial image B1 and the partial image B2 are added to the right end of the partial image B1. As a result, the data of one line of the partial image B1 including the 4-byte dummy pixels is 514 bytes. When writing the partial image B1 including the dummy pixels in the DRAM 230, a CPU 204 instructs the WRDMAC 300 of the data-transfer controlling unit 220 to write the data while setting the write address so as to continue from the end of the first line to the start of the second line. As described above, when writing the partial image B1 including the added dummy pixels in the DRAM 230, the write address need not be jumped halfway in every line, as indicated by a sequence 201 in FIG. 11A. It is therefore possible to write the partial image B1 in the DRAM 230 only by the maximum 16 burst transfer. As a result, the write data amount to the DRAM 230 becomes larger than in the processing of the second embodiment. However, when the number of added dummy pixels is small, as in the third embodiment, the time needed to transfer the whole data of each partial image to the DRAM 230 can be shortened by writing data including the added data amount in the DRAM 230 and thus decreasing the short burst access count.

The pixel cutting unit 311 reads out a whole partial image including the dummy pixels added by the pixel copying unit 301 from the DRAM 230. The pixel cutting unit 311 deletes the added dummy pixels from the readout partial image and outputs the partial image to the second signal processing unit 211. When the partial image including the dummy pixels is read out from the DRAM 230, the DRAM 230 need not jump the read address halfway, as indicated by a sequence 202 in FIG. 11A. For this reason, the partial image can be read out from the DRAM 230 only by 16 burst transfer. In this case, the data amount read out from the DRAM 230 increases. However, when the number of added pixels is small, as in the third embodiment, the access efficiency to the DRAM 230 can be improved, and the time needed to read out the image can be shortened by reading out the added pixels as well and thus decreasing the short burst access count.

FIG. 11B shows access of transfer data to the DRAM 230 when the first signal processing unit 210 and the second signal processing unit 211 process the second partial image B2. The second signal processing unit 211 performs the processing using 4-byte data (201a in FIG. 11B) at the right end of line 1 (except the added pixels) of the first partial image B1 stored in the DRAM 230 as 4-byte data at the left end of the second partial image B2. For this reason, the first signal processing unit 210 does not transfer the 4-byte data at the left end of the second partial image B2 and transfers the image data of the second partial image B2 other than the 4-byte data at the left end of the second partial image B2. Then, the CPU 204 controls the WRDMAC 300 of the data-transfer controlling unit 220 to set an address immediately after the storage address of the 4-byte data at the right end of each line of the partial image B1 as a write start address W_S_Addr, and starts writing the partial image B2. Since the horizontal size of the partial image B2 is 514 bytes, no dummy pixels need be added. However, the CPU 204 sets the WRDMAC 300 of the data-transfer controlling unit 220 to jump the address by only 4 bytes every time data of 510 bytes is written.

On the other hand, the CPU 204 sets, in the RDDMAC 310, the storage address of the start of the 4-byte data at the right end of line 1 of the partial image B1 as a read start address R_S_Addr, and causes the RDDMAC 310 to start transfer of the partial image B2 to the second signal processing unit 211. When reading out the partial image B2 from the DRAM 230, address jump processing is unnecessary, and the read can be implemented only by 16 burst transfer.

FIG. 11C shows access of transfer data to the DRAM 230 when the first signal processing unit 210 and the second signal processing unit 211 process a third partial image B3. The second signal processing unit 211 performs the processing using 4-byte data (201b in FIG. 11C) at the right end of line 1 of the second partial image B2 stored in the DRAM 230 as 4-byte data at the left end of the third partial image B3. For this reason, the first signal processing unit 210 does not transfer the 4-byte data at the left end of the third partial image B3 and transfers the image data of the third partial image B3 other than the 4-byte data at the left end of the third partial image B3. Then, the CPU 204 controls the WRDMAC 300 of the data-transfer controlling unit 220 to set an address immediately after the storage address of the 4-byte data at the right end of each line of the partial image B2 as the write start address W_S_Addr, and writes the image data of the partial image B3. In the partial image B3, data of one line is 506 bytes except the 4-byte data at the left end. The CPU 204 controls the WRDMAC 300 and sets to jump the write address by only 8 bytes every time data of 506 bytes of each line except the 4-byte data at the left end is written.

On the other hand, the CPU 204 sets, in the RDDMAC 310, the storage address of the start of the 4-byte data at the right end of line 1 of the partial image B2 as the read start address R_S_Addr, and reads out the image data of the partial image B3 and transfers it to the second signal processing unit 211. When reading out the partial image B3 from the DRAM 230, address jump processing is unnecessary, and the read can be implemented only by 17 burst transfer. However, the final 4-byte data out of the 514-byte data of one line of the partial image B3 is the 4-byte data at the left end of the partial image B2 and is not used for the processing of the partial image B3. For this reason, the CPU 204 sets to cause the pixel cutting unit 311 to cut the final 4-byte data of each line of the partial image B3 read out from the DRAM 230.

Figure 12B:
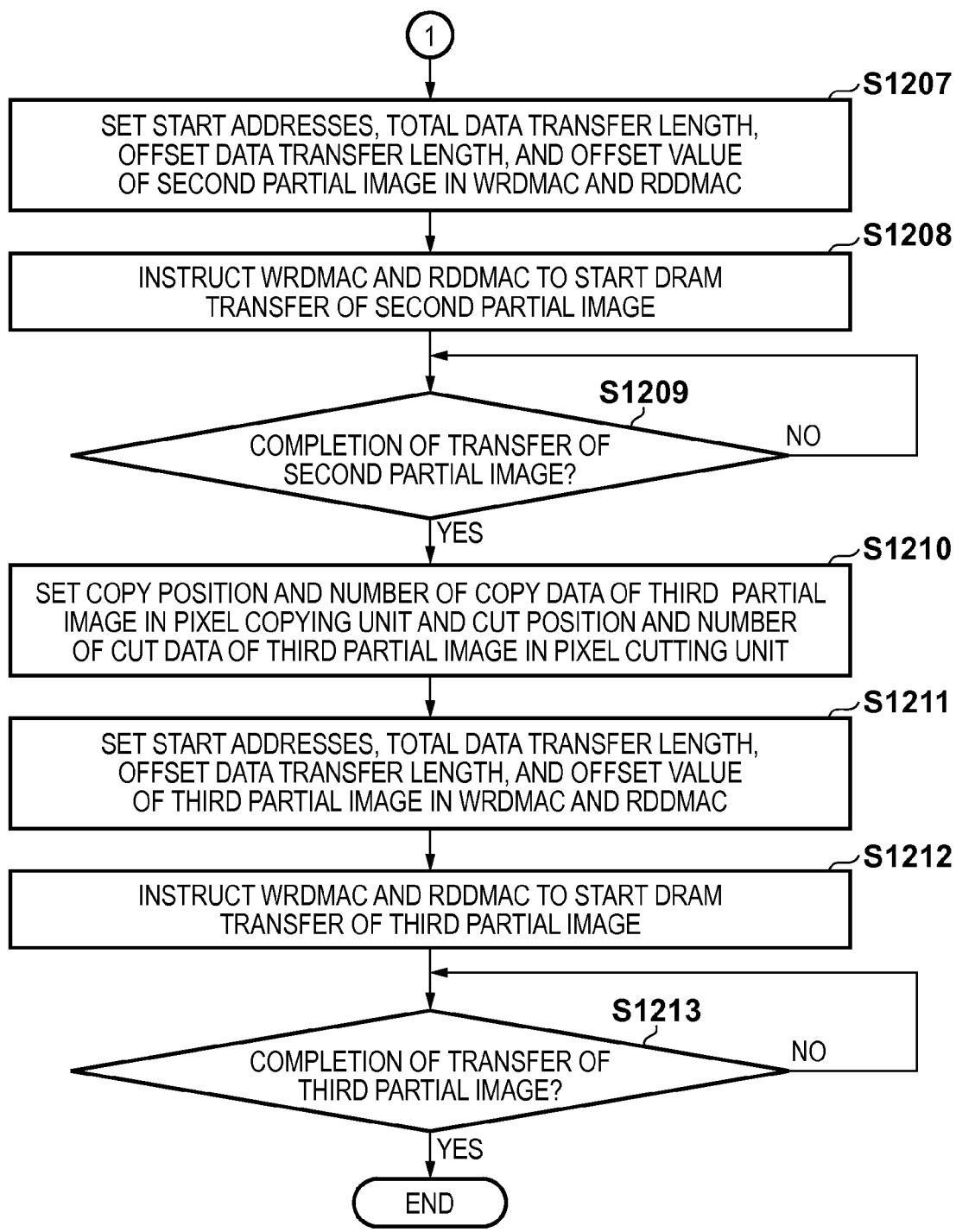

FIGS. 12A and 12B are flowcharts showing transfer processing of partial images to the DRAM 230 by the CPU 204 according to the third embodiment.

The CPU 204 sets the address-pass preventing controller 321 of the data-transfer controlling unit 220 to prevent the read address of the RDDMAC 310 from the DRAM 230 from passing the write address of the WRDMAC 300 to the DRAM 230 (step S1201). The CPU 204 sets the number of copy pixels of the first partial image B1 in the pixel copying unit 301, and sets the number of cut pixels of the partial image B1 in the pixel cutting unit 311 (step S1202). The CPU 204 sets the write/read start addresses, the total data transfer length, the offset data transfer length, and the offset value of the partial image B1 in the WRDMAC 300 and the RDDMAC 310 (step S1203). The CPU 204 instructs the WRDMAC 300 and the RDDMAC 310 to start write/read of the partial image B1 in/from the DRAM 230 (step S1204). When the write of all data of the partial image B1 in the DRAM 230 is completed (step S1205), the CPU 204 sets the number of copy pixels of the second partial image B2 in the pixel copying unit 301, and sets the number of cut pixels of the second partial image B2 in the pixel cutting unit 311 (step S1206). The CPU 204 sets the write/read start addresses, the total data transfer length, the offset data transfer length, and the offset value of the partial image B2 in the WRDMAC 300 and the RDDMAC 310 (step S1207). The CPU 204 instructs the WRDMAC 300 and the RDDMAC 310 to start write/read of the partial image B2 in/from the DRAM 230 (step S1208). When access of the partial image B2 to the DRAM 230 is completed (step S1209), the CPU 204 sets the number of copy pixels of the third partial image B3 in the pixel copying unit 301, and sets the number of cut pixels of the partial image B3 in the pixel cutting unit 311 (step S1210). The CPU 204 sets the write/read start addresses, the total data transfer length, the offset data transfer length, and the offset value of the third partial image B3 in the WRDMAC 300 and the RDDMAC 310 (step S1211). The CPU 204 instructs the WRDMAC 300 and the RDDMAC 310 to start write/read of the third partial image B3 in/from the DRAM 230 (step S1212). When the read of the partial image B3 from the DRAM 230 is completed, the CPU 204 ends the processing (step S1213).

With the above-described control, when transferring each partial image to the DRAM, the access count by short burst can be suppressed as compared to the second embodiment. It is therefore possible to shorten the processing time of the partial images.

Note that in the third embodiment, three partial images are generated from the image of one frame. However, any other number of partial images may be generated. In the third embodiment, the size of the first and third partial images is 510 bytes×384 lines, the size of the second partial image B2 is 514 bytes×384 lines, and the size of the overlap region is 4 bytes in the horizontal direction. However, other values may be set.

When the difference between the maximum horizontal size and the minimum horizontal size among the plurality of partial images is smaller than a predetermined value, that is, 16 bytes, the pixel copying unit adds dummy pixels to the partial image B1. However, another value may be set as the predetermined value. In the third embodiment, at the time of the first partial image B1 to the DRAM 230, the dummy pixels are added to the end of the data of one line. However, the dummy pixels may be added in the middle of one line.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-252418, filed Dec. 5, 2013, which is hereby incorporated by reference herein in its entirety.

What is claimed is:

1. An image processing apparatus comprising:
a plurality of image processing units each configured to process image data including a plurality of portions,
the plurality of portions including regions overlapping each other,
said plurality of image processing units including a first image processing unit configured to perform first image processing using the portion as a unit, and a second image processing unit configured to perform second image processing using the portion as a unit for the image data processed by said first image processing unit, and
the plurality of portions including a first portion and a second portion to be processed next to the first portion;
a memory; and
a controller configured to write the image data processed by said first image processing unit in said memory, and read out the image data stored in said memory and transfer the image data to said second image processing unit,
said controller writing, out of the image data of the second portion output from said first image processing unit, the image data of a region other than a region overlapping the first portion at an address that continues from the address of the image data of the overlap region in the image data of the first portion output from said first image processing unit, and reading out the image data of the second portion including the image data of the overlap region from said memory and transferring the image data to said second image processing unit.

2. The apparatus according to claim 1, wherein the plurality of portions include pixels at different positions of a horizontal line of the image data, and
the overlap regions include pixels at the same positions of the horizontal line of the image data.

3. The apparatus according to claim 2, wherein said controller sets an address immediately after a storage address of the image data of the overlap region in a first line of the first portion as a write start address of a portion of the second portion which does not overlap the first portion, and said controller jumps an address to write the image data of the second portion of a next horizontal line by a data amount corresponding to the overlap region every time the image data of one horizontal line in the portion of the second portion which does not overlap the first portion is written.

4. The apparatus according to claim 3, wherein said controller sets the storage address of the image data of the overlap region in the first horizontal line of the first portion as a read start address of the second portion.

5. The apparatus according to claim 3, wherein the first portion comprises a portion to be processed first in the image data of one frame, and said controller writes the image data of a plurality of horizontal lines of the first portion at continuous addresses.

6. The apparatus according to claim 2, wherein the plurality of portions include, in one horizontal line, pixels in numbers equal to each other.

7. The apparatus according to claim 2, wherein the number of pixels of one horizontal line of the second portion is larger than the number of pixels of one horizontal line of the first portion, and said controller jumps an address to write the image data of the second portion of a next horizontal line by a data amount corresponding to a sum of a data amount corresponding to the overlap region and a data amount corresponding to a difference between the number of pixels of one horizontal line of the first portion and the number of pixels of one horizontal line of the second portion every time the image data of one horizontal line in the portion of the second portion which does not overlap the first portion is written.

8. The apparatus according to claim 2, wherein the number of pixels of one horizontal line of the second portion is larger than the number of pixels of one horizontal line of the first portion, and said controller adds dummy data in a data amount corresponding to a difference between the number of pixels of one horizontal line of the first portion and the number of pixels of one horizontal line of the second portion to the image data of each horizontal line of the first portion, and writes the image data of a plurality of horizontal lines including the added dummy data at continuous addresses.

9. The apparatus according to claim 2, wherein each of said plurality of image processing units performs processing using a plurality of pixels adjacent in a vertical direction of the image data.

10. The apparatus according to claim 1, wherein said memory comprises a DRAM (Dynamic Random Access Memory), and said controller writes image data of one portion at the same row address of the DRAM.

11. The apparatus according to claim 1, further comprising an imaging unit, wherein said first image processing unit processes image data output from said imaging unit.

* * * * *